United States Patent [19]

Pickering

[11] Patent Number: 4,557,343
[45] Date of Patent: Dec. 10, 1985

[54] POWER STEERING CONTROL APPARATUS AND METHOD

[75] Inventor: William Pickering, University Heights, Ohio

[73] Assignee: Towmotor Corporation, Mentor, Ohio

[21] Appl. No.: 638,849

[22] Filed: Aug. 8, 1984

[51] Int. Cl.$^4$ .......................... B62D 5/04; B62D 5/06
[52] U.S. Cl. ...................................... 180/142; 364/424
[58] Field of Search ................. 180/142, 143; 364/424

[56] References Cited

U.S. PATENT DOCUMENTS

| | | | |
|---|---|---|---|
| 3,690,400 | 9/1972 | Uchiyama et al. | 180/79.2 R |
| 3,875,747 | 4/1975 | Briggs | 60/420 |
| 3,901,343 | 8/1975 | Inoue | 180/79.2 R |
| 3,939,938 | 2/1976 | Inoue | 180/79.2 R |
| 4,043,419 | 8/1977 | Larson et al. | 180/132 |
| 4,320,812 | 3/1982 | Takaoka et al. | 180/143 |
| 4,457,390 | 7/1984 | Abe et al. | 180/142 |
| 4,476,529 | 10/1984 | Nakamura et al. | 180/142 X |
| 4,499,964 | 2/1985 | Abe et al. | 180/142 |

FOREIGN PATENT DOCUMENTS

| | | | |
|---|---|---|---|
| 58-180380 | 10/1983 | Japan | 180/142 |
| 2116130 | 9/1983 | United Kingdom . | |

*Primary Examiner*—Richard E. Gluck
*Attorney, Agent, or Firm*—Stephen L. Noe

[57] ABSTRACT

Power assisted steering systems are commonly used on industrial vehicles such as industrial lift trucks. Advantageously, the output of such systems should be responsive to vehicle speed and the systems should be energy efficient. The subject power steering control system includes processor means for receiving a steering demand signal and a speed control signal, producing a high fluid flow rate signal in response to receiving the steering demand signal and to the speed control signal representing a vehicle speed less than or equal to a predetermined vehicle speed, producing a low fluid flow rate signal in response to receiving the steering demand signal and to the speed control signal representing a vehicle speed greater than the predetermined speed, and producing an idle fluid flow rate signal in response to failing to receive the steering demand signal. Hydraulic means receive the high, low, and idle fluid flow rate signals, produce respective predetermined hydraulic fluid flow rates in response to the received signal, and deliver the hydraulic fluid to the steering means.

4 Claims, 4 Drawing Figures

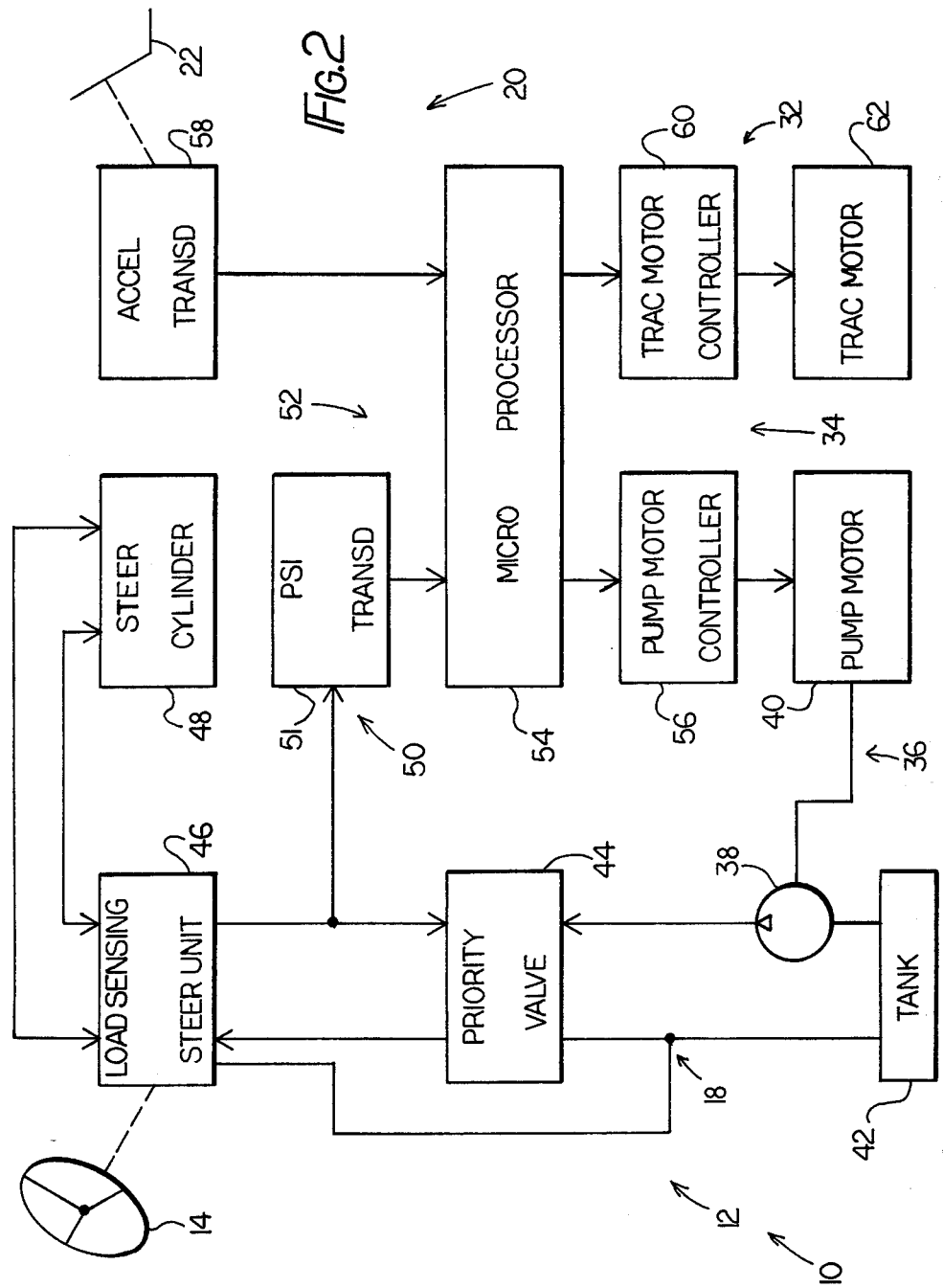

POWER STEERING CONTROL APPARATUS AND METHOD

1. Technical Field

This invention relates generally to an apparatus and method for controlling a power steering system for a vehicle and, more particularly, to an apparatus and method for controllably providing power assisted steering to a vehicle responsive to the vehicle speed.

2. Background Art

Various types of power assisted steering systems are in common use on vehicles today. Such systems typically include a steering wheel mechanically connected to one or more steered wheels. An electrohydraulic motor and pump provides a source of pressurized hydraulic fluid. The hydraulic fluid is controllably directed to one or more hydraulic cylinders attached to the steering mechanism. Such power steering systems significantly reduce the manual effort required to steer modern vehicles, but continue to have various shortcomings.

An example of a power steering system is shown in U.S. Pat. No. 4,043,419, issued on Aug. 23, 1977 to Larson et al. A load sensing power steering system is disclosed which selectively controls the flow of fluid to a steering motor. The system includes a steering control valve disposed between a pump and the steering motor, and a priority valve disposed between the pump and the steering control valve. This system functions to give priority to steering demands in response to the steering load pressure.

One recognized problem with such power steering systems involves the varying amount of power assist required to steer a particular vehicle at different ground speeds. The steerable wheels of a vehicle must be rotated through a relatively large angle to steer the vehicle when it is stationary or is being driven at a relatively low velocity. Conversely, a vehicle being driven at a relatively high velocity requires the steerable wheels to be rotated through only a small angular range to accomplish the same steering effect. Therefore, the amount of power assist required is significantly less when a vehicle is being propelled at a high ground speed than for a vehicle being propelled at a low ground speed or for a stationary vehicle.

It is recognized in the art that the flow of hydraulic fluid to the power steering cylinders can advantageously be varied responsive to the vehicle speed. For example, U.S. Pat. No. 4,320,812 issued on Mar. 23, 1982 to Takaoka et al. teaches a power steering system having a constant speed electric motor driving a hydraulic pump, and a fluid flow restrictor that varies in response to vehicle speed. Vehicle speed is determined by use of a vehicle speed sensor that produces an electric signal in response to the vehicle speed, and the fluid flow restrictor is varied in response to this electric signal by means of an electric stepper motor.

Other approaches involve the use of a fluid bypass valve to shunt fluid away from the power steering cylinder in response to the vehicle speed and systems that apply reactive force to oppose the power assisted steering that varies in response to the vehicle speed. Each of these approaches utilizes a constant hydraulic flow and a vehicle speed sensor or transducer of some type.

The use of a constant hydraulic flow causes no particular problem in automotive applications where the hydraulic pump is driven directly by an internal combustion engine and hydraulic fluid is readily and continuously supplied. However, in industrial vehicles such as lift trucks, electric motors are often used to drive the hydraulic pump. Battery energy conservation is of prime importance in such vehicles. Therefore, it is undesirable to employ a system having a constant hydraulic flow when such flow is not continuously required. Furthermore, the requirement for a vehicle speed sensor imposes additional manufacturing costs in designing a power assisted steering system and poses additional maintenance requirements throughout the life of the vehicle.

The present invention is directed to overcoming one or more of the problems as set forth above.

DISCLOSURE OF THE INVENTION

In one aspect of the present invention a power steering control apparatus for a vehicle is provided. The apparatus includes steering means for controllably steering the vehicle and steering transducer means for producing a steering demand signal responsive to the steering means. Speed control means are provided for controllably propelling the vehicle at a plurality of different speeds. Processor means receive the steering demand signal and produce a high fluid flow rate signal in response to receiving the demand signal and to the vehicle being propelled at or below a predetermined speed. The processor means also produce a low fluid flow rate signal in response to receiving the demand signal and to the vehicle being propelled at greater than the predetermined speed and produce an idle fluid flow rate signal in response to failing to receive the demand signal. Hydraulic means receive the high, low, and idle fluid flow rate signals, produce respective predetermined hydraulic fluid flow rates in response to the received signal, and deliver the hydraulic fluid to the steering means.

In a second aspect of the present invention, a method for providing power steering control to a vehicle is provided. The vehicle includes power steering means and an accelerator member. The method includes the steps of producing a steering demand signal in response to steering the vehicle and producing a speed demand signal in response to the position of the accelerator member. A predetermined speed control signal is produced in response to the speed demand signal and the vehicle is controllably propelled at a speed responsive to the speed control signal. A high fluid flow rate signal is produced in response to receiving the demand signal and to the produced speed control signal representing the vehicle speed less than or equal to a predetermined vehicle speed. A low fluid flow rate signal is produced in response to receiving the demand signal and to the produced speed control signal representing a vehicle speed greater than the predetermined speed. An idle fluid flow rate signal is produced in response to failing to receive the demand signal. Respective predetermined hydraulic fluid flow rates are produced in response to the flow rate signals and the hydraulic fluid is delivered to the power steering means.

The present invention provides a power steering control system that is advantageously responsive to vehicle speed, that is inherently energy efficient, and that can function without need for a vehicle velocity or speed sensor.

BRIEF DESCRIPTION OF THE DRAWINGS

For a better understanding of the present invention, reference may be made to the accompanying drawings, in which:

FIG. 2 is a block diagram of one embodiment of the present invention;

BEST MODE FOR CARRYING OUT THE INVENTION

Figure 1:
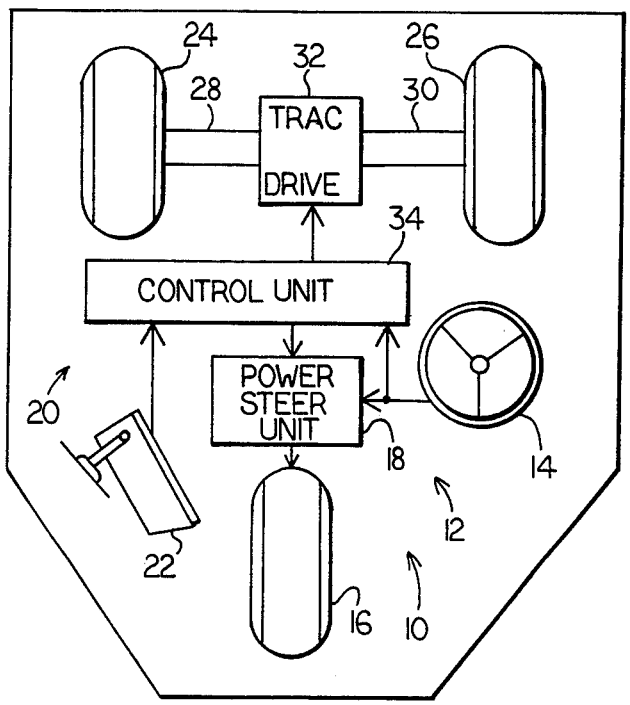
FIG. 1 is a schematized view of a vehicle incorporating one embodiment of the present invention.

Referring first to FIG. 1, an apparatus embodying certain of the principles of the present invention is generally indicated by the reference numeral 10. It should be understood that the following detailed description relates to the best presently known embodiment of the apparatus 10. However, the apparatus 10 can assume numerous other embodiments, as will become apparent to those skilled in the art, without departing from the appended claims.

In FIG. 1, a vehicle is shown to include a steerable wheel 16 and left and right traction wheels 24,26. Speed control means 20 includes an accelerator pedal 22 connected to a speed control unit 34. The speed control unit is connected to a traction drive unit 32 which in turn is connected to left and right axle halves 28,30. Each axle half 28,30 is connected to a respective one of the traction wheels 24,26.

Steering means 12 includes a steering wheel 14 connected to a power steering unit 18 and to the control unit 34. The control unit 34 is likewise connected to the power steer unit 18 and to the steerable wheel 16.

Referring next to FIG. 2, a detailed description of the embodiment of FIG. 1 is represented. The power steering control apparatus 10 includes steering means 12 for controllably steering the vehicle. The steering means 12 includes the steering wheel 14 connected to a load sensing steer unit 46. The load sensing steer unit 46 is interconnected with a steer cylinder 48 which provides power assisted steering to the steering mechanism (not shown).

The load sensing steer unit 46 is also connected to an hydraulic means 36. The hydraulic means 36 includes a hydraulic pump 38 operatively connected with a pump motor 40. The hydraulic pump 38 has an input connected to a tank or source of hydraulic fluid 42 and an output connected to a priority valve 44. Hydraulic fluid is provided through the priority valve 44 to the load sensing steer unit 46 in a conventional closed loop system. Steering transducer means 50 for producing a steering demand signal responsive to the steering means 12 is connected to the closed loop hydraulic circuit. In the preferred embodiment, the steering transducer means 50 includes a pressure transducer 51.

Speed control means 20 includes an accelerator pedal 22 connected to an accelerator transducer 58. The accelerator pedal 22 is movable to a plurality of positions, and the accelerator transducer means 58 produces a speed demand signal in response to the position of the accelerator pedal 22. The speed control means 20 produces a predetermined speed control signal in response to the speed demand signal, and controllably propels the vehicle at a speed responsive to the produced speed control signal.

In the preferred embodiment, the accelerator transducer 58 is connected to a processor means 52 for producing the predetermined speed control signal. The speed control signal is delivered to a traction motor controller 60 which is part of the traction drive 32. The traction motor controller 60 in turn is connected to a traction motor 62. The speed control signal is advantageously a pulse width modulated pulse train or a digital signal representing a pulse width modulated pulse train. The pulse width modulated signal is delivered to the traction motor controller 60 which is advantageously a conventional chopper type control circuit. Therefore, power delivered to the traction motor 62 is in the form of a pulse width modulated signal and the traction motor speed is controllably varied in response to the duty factor of the pulse width modulated signal. The traction motor 62 responsively rotates the left and right axle halves 28,30 and the left and right traction wheels 24,26.

The processor means 52 receives the steering demand signal from the steering transducer means 50, produces a high fluid flow rate signal in response to receiving the steering demand signal and to the produced speed control signal representing a vehicle speed less than or equal to a predetermined vehicle speed, produces a low fluid flow rate signal in response to receiving the steering demand signal and to the produced speed control signal representing a vehicle speed greater than the predetermined speed, and produces an idle fluid flow rate signal in response to failing to receive the steering demand signal. As with the traction drive system, in the preferred embodiment the high, low, and idle fluid flow rate signals are pulse width modulated signals or digital signals representing such pulse width modulated signals. The hydraulic means 36 receives the high, low, and idle fluid flow rate signals, produces respective predetermined hydraulic fluid flow rates in response to the received signal, and delivers the hydraulic fluid to the steering means 12. The flow rate signals are delivered from the processor means 52 to the pump motor controller 56. The pump motor controller is advantageously a chopper type controller as in the traction motor system, and pulse width modulated power is delivered to the pump motor 40. Therefore, the speed of rotation of the pump motor 40 is variable in response to the high, low, and idle fluid flow rate signals delivered from the processor means 52 to the pump motor controller 56.

Industrial Applicability

Operation of the apparatus 10 is best described in relation to its use on a vehicle, for example, an industrial vehicle such as an electric lift truck. Assume first that the vehicle is stationary and that no steering activity is in progress. Responsively, the accelerator transducer 58 produces a zero speed demand signal and the processor means 52 produces a speed control signal representing zero speed. Correspondingly, the traction motor 62 is free from driving the left and right traction wheels 24,26.

Figure 4:
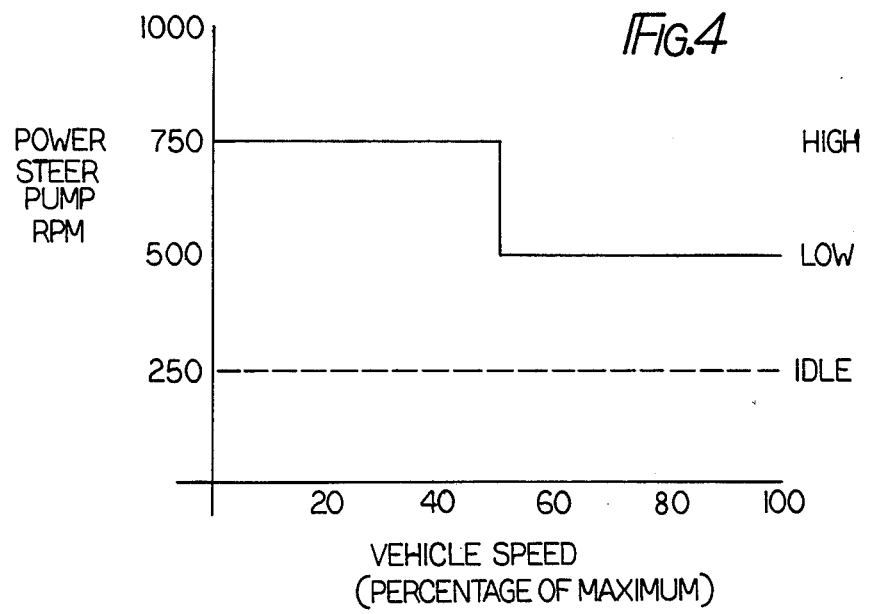

Likewise, the steering transducer means 50 delivers a zero steering demand signal to the processor means 52. The processor means 52 produces an idle fluid flow rate signal which is delivered to the pump motor controller 56. Responsively, the pump motor controller 56 drives the pump motor 40 at a predetermined idle speed. This idle speed is shown in FIG. 4 in terms of pump rpm, as a dashed line representing, for example, 250 rpm. As the vehicle speed increases responsive to movement of the accelerator pedal 22, the above relationship between power steering demand and power steering fluid flow remains constant.

Assuming next that the vehicle is stationary and a steering maneuver is required, the steering wheel 14 is rotated in the desired direction. Responsively, a pressure signal is sensed by the steering transducer means 50 and delivered as a steering demand signal to the processor means 52. The processor means 52 receives the steering demand signal and delivers a signal to the pump motor controller 56 in response to the currently produced speed control signal. With the vehicle stationary, the speed control signal is zero and the processor means 52 delivers the high fluid flow rate signal to the pump motor controller 56. This remains true for any produced vehicle speed control signal up to and including a predetermined vehicle speed. In the preferred embodiment, the predetermined vehicle speed is substantially one half of the maximum vehicle speed. Therefore, for any selected vehicle speed up to and including one half of maximum speed, the processor means 52 produces the high fluid flow rate signal in response to receiving the steering demand signal. Responsively, the pump motor controller 56 operates the pump motor 40 at a high speed. As shown in FIG. 4, the high speed power steer pump rpm is, for example, equal to 750 rpm.

In response to the vehicle speed control signal being greater than the predetermined vehicle speed, 50% of maximum speed in the preferred embodiment, the processor means 52 delivers the low fluid flow rate signal to the pump motor controller 56. Responsively, the pump motor 40 is operated at low speed, shown in FIG. 4 as, for example, 500 rpm.

Figure 3:
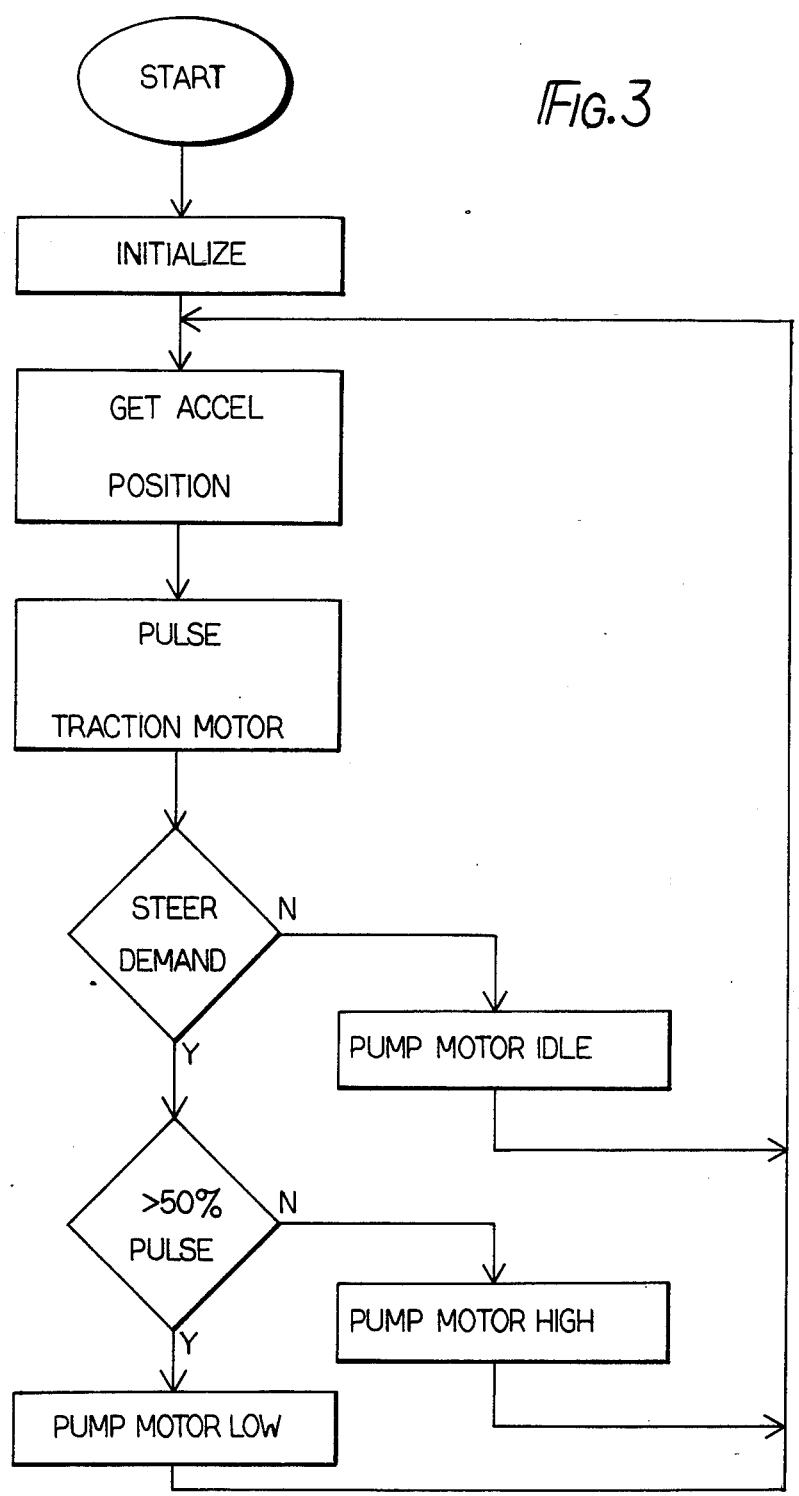
FIG. 3 is a flowchart of software used with one embodiment of the present invention; and, FIG. 4 is a graphic representation used in describing one embodiment of the present invention.

The processor means 52 is preferably a microprocessor 54. Referring to FIG. 3, a functional flowchart defining the internal programming for the microprocessor 54 is shown. From this flowchart, a programmer of ordinary skill can develop a specific set of program instructions that performs the steps necessary to implement the instant invention. It will be appreciated that, while the best mode of the invention is considered to include a properly programmed microprocessor, the result of which is the creation of novel hardware associations within the microprocessor and its associated devices, it is possible to implement the instant invention utilizing traditional hardwired circuits.

Beginning at the block labeled START in the flowchart, the microprocessor first undertakes an initialization process wherein the pump motor speed is established at the idle speed and the traction motor drive is turned off. Next, the accelerator position is received from the accelerator transducer 58 and an appropriate speed control signal is delivered to the traction motor controller 60.

Next, the signal delivered from the steering transducer is checked to determine whether a steering demand is present. If not, the idle fluid flow rate signal is delivered to the pump motor controller 56 and program control returns to begin another pass through the program. If the steering demand signal is present, the magnitude of the speed control signal is next determined. If the currently produced speed control signal is greater than 50% of maximum, the low fluid flow rate signal is delivered to the pump motor controller 56 and program control returns for another pass through the program. If the speed control signal is equal to or less than 50% of maximum, the high fluid flow rate signal is delivered to the pump motor controller 56 before program control returns for another pass through the program.

Therefore, in response to failing to receive a steering demand signal, the pump motor 40 continues to run at idle speed and in response to receiving a steering demand signal, the pump motor 40 runs at either a high speed or an intermediate or low speed responsive to the controlled speed of the vehicle. Advantageously, the controlled vehicle speed can be determined by reference to the produced speed control signal without need for use of an external vehicle speed determining sensor or transducer.

It will be appreciated by those skilled in the art that it is not essential to incorporate all of the steps represented in the flowchart of FIG. 3 in a given system, nor is it necessary to implement the steps of FIG. 3 in a microprocessor. However, such an implementation is deemed to be the best mode of practicing the invention owing to the broad and widespread availability of suitable microprocessor circuits, the widespread understanding of programming techniques for such microprocessors, the cost reduction in such circuitry which has been realized in recent years, and the flexibility afforded by such a programmable device.

The embodiment of the present invention described above is advantageously energy efficient owing to the fact that only the amount of hydraulic fluid required by the system at any particular point in time is produced. Additionally, use of the produced speed control signal to determine pump motor speed obviates the need for an additional vehicle speed sensor or transducer. Therefore, the additional expense and maintenance involved with such a transducer is avoided.

Other aspects, objects, advantages, and uses of this invention can be obtained from a study of the drawings, the disclosure, and the appended claims.

I claim:

1. A power steering control apparatus for a vehicle, comprising:
   steering means for controllably steering said vehicle;
   steering transducer means for producing a steering demand signal responsive to said steering means;
   an accelerator member moveable to a plurality of positions;
   accelerator transducer means for producing an speed demand signal in response to the position of said accelerator member;
   speed control means for receiving said speed demand signal, producing a predetermined speed control signal in response to said received speed demand signal, and controllably propelling said vehicle at a speed responsive to said speed control signal;
   processor means for receiving said steering demand signal and said speed control signal, producing a high flow rate signal in response to receiving said steering demand signal and to said produced speed control signal representing a vehicle speed less than or equal to a predetermined vehicle speed, producing a low flow rate signal in response to receiving said steering demand signal and to said produced speed control signal representing a vehicle speed greater than said predetermined speed, and producing an idle flow rate signal in response to failing to receive said steering demand signal; and, hydraulic means for receiving said high, low, and idle flow rate signals, producing respective predetermined hydraulic fluid flow rates in response to said received signal, and delivering said hydraulic fluid to said steering means.

2. A power steering control apparatus, as set forth in claim 1, wherein said predetermined speed is substantially equal to one half of maximum vehicle speed.

3. A power steering control apparatus, as set forth in claim 1, wherein said speed control signal represents a pulse width modulated pulse train.

4. A method for providing power steering control for a vehicle, said vehicle having power steering means and an accelerator member, comprising the steps of:
producing a steering demand signal in response to steering said vehicle;
producing a speed demand signal in response to the position of said accelerator member;
producing a predetermined speed control signal in response to said received speed demand signal;
controllably propelling said vehicle at a speed responsive to said speed control signal;
producing a high flow rate signal in response to receiving said steering demand signal and to said produced speed control signal representing a vehicle speed less than or equal to a predetermined vehicle speed;
producing a low flow rate signal in response to receiving said steering demand signal and to said produced speed control signal representing a vehicle speed greater than said predetermined speed;
producing an idle flow rate signal in response to failing to receive said demand signal;
producing respective predetermined hydraulic fluid flow rates in response to said produced flow rate signals; and,
delivering said hydraulic fluid to said power steering means.

* * * * *